United States Patent Office 3,576,002
Patented Apr. 20, 1971

3,576,002
DITHIOLE COMPOUNDS AND PREPARATION
Erwin Klingsberg, Mountainside, N.J., assignor to American Cyanamid Company, Stamford, Conn.
No Drawing. Filed Mar. 12, 1968, Ser. No. 712,382
Int. Cl. C07d 71/00; C09b 49/00
U.S. Cl. 260—327
9 Claims

ABSTRACT OF THE DISCLOSURE 3-chloro-1,2-dithiolium salts condense with phenolic compounds to form dyes of Formulas I (salt) or II (free base):

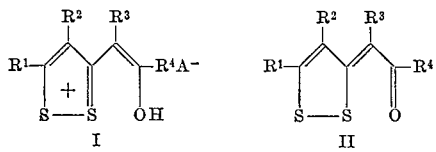

where typically $R^1$ and $R^2$ together form a benzo or naphtho nucleus; $R^3$ and $R^4$ together form a substituted or unsubstituted phenyl, naphtho or phenanthro nucleus, the substituents being alkyl, halo, carboxyl or di(lower) alkylamino; and $A^-$ is an anion. The products are useful dyes.

---

This invention relates to heterocyclic carbon compounds in which the hetero atom is sulfur and processes for their preparation.

More particularly, the compounds of the invention, condensation products of 3-chloro-1,2-dithiolium salts with phenolic compounds, are salts or free bases of Formulas I and II, respectively:

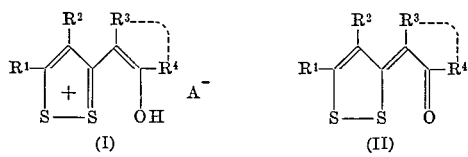

where $R^1$ and $R^2$ together with the dithiole ring form a monocyclic or fused bicyclic aromatic group; $R^3$ and $R^4$ together with the carbon atoms to which they are bonded form a substituted or unsubstituted mono-, di- or tricyclic aromatic group, said substituents being lower alkyl, halo, carboxyl or di(lower alkyl) amino; and $A^-$ is an anion derived from an acid.

The free base structures (II) are formed from the corresponding salts (I) by treating the latter with a base such as pyridine, ammonium hydroxide or sodium hydroxide. This relationship is illustrated below with respect to the condensation product of 3-chloro-1,2-benzodithiolium chloride with 3,4-dimethyl phenol:

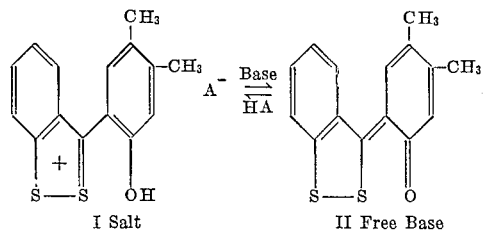

Typical salting-forming reagents are inorganic acids such as hydrochloric, sulfuric, perchloric, and the like, or organic acids, both monocarboxylic and polycarboxylic, such as acetic, propionic butyric, orctanoic, benzoic, malic, dinicotinic, terephthalic and the like.

The compounds are prepared by reaction of a 3-chloro-1,2-dithiolium salt (wherein the salt portion normally is the anion $A^-$ defined above) with a phenolic compound in which the dithiolium salt attacks a position on the phenolic compound nucleus activated by the phenolic hydroxyl group.

The reaction occurs readily at room temperature and atmospheric pressure, although these conditions may be varied if desired. An inert solvent, such as acetonitrile, ethyl acetate or tetrahydrofuran, normally is employed as the reaction medium. The immediate product generally is the salt, but the corresponding free base is conveniently obtained by treating with a base.

Typical 3-chloro-1,2-dithiolium salt reactants are 3-chloro-1,2-dithiolium chloride, 3-chloro-5-phenyl-1,2-dithiolium chloride, 3-chloro-4,5-diphenyl-1,2-dithiolium chloride, 3-chloro-1,2-benzodithiolium chloride (prepared by reacting 3H-1,2-benzodithiole-3-thione and sulfur dichloride), and the salt obtained by the reaction of 5-methyl-3H-naphtho[1,2-c]-1,2-dithiole-3-thione and sulfur dichloride which is 3-chloro-5-methylnaphtho[1,2-c]-1,2-dithiolium chloride. The preparation of some of the salts is described further hereinafter, by Faust and Mayer, Ann. 688, 150 (1965), or in U.S. Pat. 3,211,749.

Typical phenolic compounds are 3,4,5-trimethylphenol, 3,4-dimethylphenol, 4-chloro-1-naphthol, 3-hydroxy-2-naphtholic acid, 2-naphthol, 9-phenanthrol, 1,6-dibromo-2-naphthol, 4-methyl-1-naphthol, 3-dimethylamino-4-methylphenol, 2,6-dimethylphenol, and the like. The halogen substituents on the ring or rings formed by $R^3$ and $R^4$ taken together are provided either by a phenolic compound reactant having such substituents or by halogenating the reaction product as described in the following examples.

The compounds of the invention are useful as dyes for fibers and fabrics, particularly synthetics such as polyester, cellulose acetate, polyacrylonitrile, nylon and polypropylene, and may be applied in the conventional manner. The base forms of the compounds often provide either different hues or deeper shades than the salts. Moreover, the substituents on the ring or rings defined by $R^3$ and $R^4$ often alter the color of the unsubstituted compound, as further described in the examples below.

The following examples are intended to further illustrate but not necessarily to limit the invention. Temperatures are in degrees centigrade.

EXAMPLE 1

3-chloro-1,2-benzodithiolium chloride

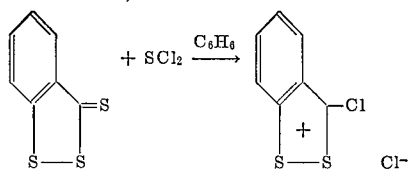

A solution of 6 grams 3H-1,2-benzodithiole-3-thione, in 60 milliliters refluxing benzene was stirred vigorously during the addition of 6.0 milliliters sulfur dichloride. Stirring and refluxing were continued for one-half hour, followed by cooling and filtration. The product was washed with a little carbon disulfide and quickly dried to yield 7.0 grams of yellow solid.

EXAMPLE 2

3-(2,3,4-trimethyl-6-oxo-2,4-cyclohexadien-1-ylidene)-3H-1,2-benzodithiole

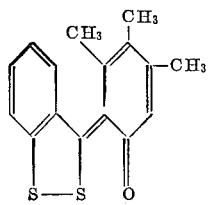

A mixture of 28 grams 3-chloro-1,2-benzodithiolium chloride and 13.6 grams 3,4,5-trimethylphenol in 200 milliliters acetonitrile was stirred several hours and filtered. The orange hydrochloride salt crystallized from acetic acid, melting point 245°. Pyridine gave the violet base, which was crystallized from nitromethane or methylcyclohexane, melting point 163°. It gave violet dyeings on polyester fibers.

EXAMPLE 3

3-(5-bromo-2,3,4-trimethyl-6-oxo-2,4-cyclohexadien-1-ylidene-3H-1,2-benzodithiole

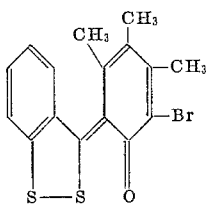

A mixture of 3.2 grams of the chloride prepared in Example 2 and 75 milliliters acetic acid was stirred and treated with a solution of 0.55 milliliter bromine in 15 milliliters acetic acid. The orange product was converted to the purple base by treatment with alcoholic ammonia and crystallized from nitromethane or methylcyclohexane, melting point 183°. It gave bright greenish-yellow dyeings on polyester, nylon, acetate, and modified polypropylene fibers.

EXAMPLE 4

3-(3,4-dimethyl-6-oxo-2,4-cyclohexadien-1-ylidene)-3H-1,2-benzodithiole

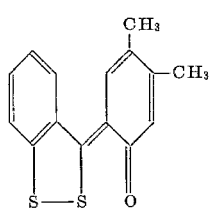

3-chloro-1,2-benzodithiolium chloride (10 grams) and 12.2 grams 3,4-dimethylphenol were stirred several hours in 100 milliliters acetonitrile. The product was filtered, digested in warm dilute sodium hydroxide, filtered, and dried. It gave purple brown crystals from nitromethane or methylcyclohexane, melting point 156°.

EXAMPLE 5

3-(4-dimethylamino-6-hydroxy-m-tolyl)-5-phenyl-1,2-dithiolium perchlorate

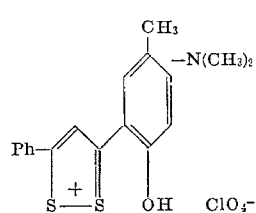

A mixture of 16.7 grams 3-chloro-5-phenyl-1,2-dithiolium chloride and 20 grams 3-dimethylamino-4-methylphenol in 200 milliliters acetonitrile was stirred for 72 hours at room temperature and filtered. The product was dissolved in water and converted to the perchlorate salt by addition of perchloric acid. The deep blue solid was filtered and recrystallized from methanol or acetic acid. It gave red dyeings on polyethylene and polyester fibers and violet dyeings on acrylic fibers.

EXAMPLE 6

3-(4-chloro-1,2-dihydro-1-oxo-2-naphthylidene)-3H-1,2-benzodithiole

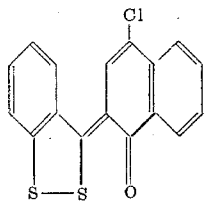

A mixture of 13 grams 3-chloro-1,2-benzodithiolium chloride and 8.9 grams 4-chloro-1-naphthol in 200 milliliters acetonitrile was stirred for four hours and filtered. The purple product was crystallized from nitromethane, melting point 212°. It gave violet dyeings on polyester fibers.

EXAMPLE 7

3-(3-carboxy-1,2-dihydro-2-oxo-1-naphthylidene)-3H-1,2-benzodithiole

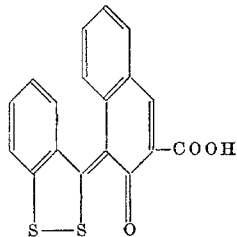

3-chloro-1,2-benzodithiolium chloride (2-grams) and 1.6 grams 3-hydroxy-2-naphthoic acid were stirred together several hours in 50 milliliters acetonitrile and then filtered. The product gave purple crystals from acetic acid or nitromethane, melting point 237°.

EXAMPLE 8

3-(1,2-dihydro-2-oxo-1-naphthylidene)-3H-1,2-benzodithiole

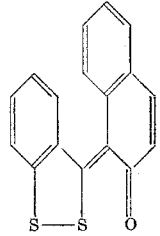

This product was obtained from 2-naphthol according to procedures described in previous examples. It was purified by chromatography on alumina, nitromethane being used as solvent and eluent. Evaporation gave a purple solid that was crystallized from methanol, melting point 163°.

EXAMPLE 9

3-(9,10-dihydro-10-oxo-9-phenanthrylidene)-3H-1,2-benzodithiole

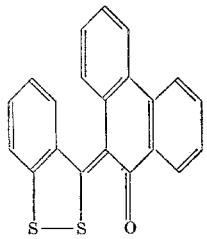

A mixture of 7.0 grams of 3-chloro-1,2-benzodithiolium chloride and 5.0 grams 9-phenanthrol in 100 milliliters acetonitrile was stirred for two hours and filtered. The purple product was crystallized from acetic acid or methylcyclohexane, melting point 208°. It gave violet dyeings on nylon polyester and cellulose acetate fibers.

EXAMPLE 10

3-(5-bromo-1,2-dihydro-2-oxo-1-naphthylidene-3H-benzodithiole

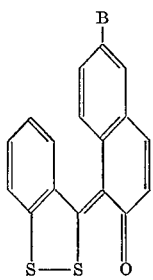

A mixture of 5.5 grams 3-chloro-1,2-benzodithiolium chloride and 7.5 grams 1,6-dibromo-2-naphthol was stirred overnight in 75 milliliters acetonitrile and filtered. The orange chloride was converted to the purple base by treatment with ammonia and crystallized from nitromethane, melting point 227°. Analysis showed that one bromine atom was eliminated during condensation, yielding the above product. It gave violet dyeings on polyester and modified polypropylene fibers.

EXAMPLE 11

3-(1,2-dihydro-4-methyl-1-oxo-2-naphthylidene)-3H-naphtho[1,2-c]-1,2-dithiole

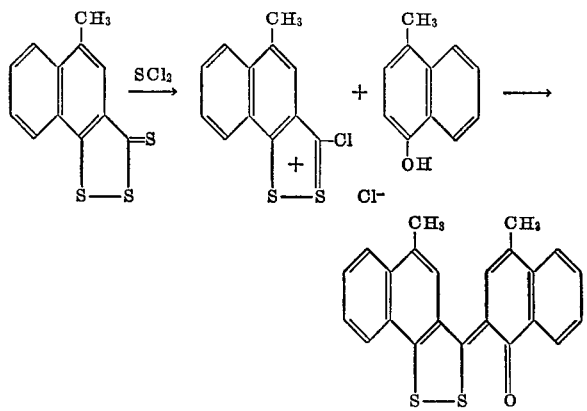

A solution of 0.50 gram 5-methyl-3H-naphtho[1,2-c]-1,2-dithiole-3-thione in 20 milliliters benzene was treated with a solution of 0.35 milliliter sulfur dichloride in 3–4 milliliters benzene, stirred at reflux for about twenty minutes, and filtered. The yellow product was washed with a little carbon disulfide, and stirred for several hours in 15 milliliters acetonitrile with 0.5 gram 4-methyl-1-naphthol. The purple product was crystallized from nitromethane, melting point 217° decomposition. It had strong affinity for polyester fibers, dyeing them a brilliant red-violet shade.

EXAMPLE 12

3-(4-hydroxy-3,5-xylyl)-1,2-benzodithiolium chloride

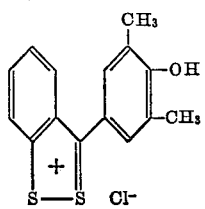

This compound, prepared from 2,6-dimethylphenol by the procedure of Example 2, gave orange crystals from acetic acid, melting point 230°. Aqueous alkali or ammonium hydroxide converted the chloride to the purple base.

I claim:
1. A compound of the formula:

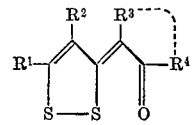

wherein $R^1$ and $R^2$ together with the dithiole ring form a benzo or naphtho group, and $R^3$ and $R^4$ together with the carbon atoms to which they are bonded form a substituted or unsubstituted benzo, naphtho or phenanthro group, said substituents being lower alkyl, halo, carboxyl, or di (lower) alkylamino and its salts.

2. The compound of claim 1 which is 3-(5-bromo-2,3,4-trimethyl-6-oxo - 2,4 - cyclohexadien - 1 - ylidene-3H-1,2-benzodithiole.

3. The compound of claim 1 which is 3-(3,4-dimethyl-6-oxo-2,4-cyclohexadien - 1 - ylidene) - 3H - 1,2-benzodithiole.

4. The compound of claim 1 which is 3-(3-carboxy-1,2-dihydro-2-oxo - 1 - naphthylidene) - 3H-1,2-benzodithiole.

5. The compound of claim 1 which is 3-(1,2-dihydro-2-oxo-1-naphthylidene)-3H-1,2-benzodithiole.

6. The compound of claim 1 which is 3-(9,10)-dihydro-10-oxo-9-phenanthrylidene)-3H-1,2-benzodithiole.

7. The compound of claim 1 which is 3-(4-hydroxy-3,5-xylyl)-1,2,-benzodithiolium chloride.

8. A process for preparing a salt of the compound of claim 1 which comprises reacting a salt having the formula $$R^1\text{---}\overset{R^2}{\underset{S\text{---}S}{\text{C}^+}}\text{---Cl} \quad A^-$$

with a phenolic compound having the formula $$HO\text{---}\overset{R^3}{\underset{R^4}{\bigcirc}}$$

where the R groups are as defined in claim 1 and $A^-$ is a salt forming anion.

9. A process for preparing the compound of claim 1 which comprises treating the salt prepared according to the process of claim 8 with a base.

References Cited

Faust et al., Chem. Abs. 64: 3512–3 (Jan. 31, 1966).

HENRY R. JILES, Primary Examiner

C. M. SHURKO, Assistant Examiner

U.S. Cl. X.R.

8—37